United States Patent Office 3,308,921
Patented Mar. 14, 1967

3,308,921
CARRIAGE
Richard R. Bower, Northridge, Calif., assignor to Leach Corporation, San Marino, Calif., a corporation of Delaware
Filed Feb. 15, 1965, Ser. No. 432,797
8 Claims. (Cl. 198—19)

This invention relates to apparatus for carrying one or more articles to an exact location.

There are a number of machines presently used which automatically convey components to a required location. However, such machines do not have the accuracy required for many types of products. Consequently, such products must be laboriously assembled and checked by hand, or else produced by machines without accurate tolerance control, with corresponding decrease in quality in the product. Prior to this invention, a machine built with the required close tolerances throughout the machine for precision assembly of parts was either too expensive to build or maintain, or else it presented operating problems arising from the close tolerances.

This invention provides apparatus for carrying an article to and locking it exactly in a location without requiring the apparatus to have close tolerance fits throughout its structure. Instead, the apparatus can have relatively loose tolerance fits throughout most of its structure, and yet is provided with means for clamping an article in an exact location with virtually zero tolerance so the article can be accurately assembled in a product.

Briefly, the apparatus includes a carriage adapted to carry an article which is to be positioned in an exact location. Means are provided for moving the carriage to and stopping it in the general vicinity of the required location. The carriage has some freedom of movement with respect to its moving means when stopped. Indexing means on the carriage and indexing means mounted adjacent the location are constructed to be movable with respect to each other and mate with each other to lock the carriage in an exact location. Means are provided for moving the two indexing means relative to each other to engage each other and position the carriage exactly in the required location. One of the indexing means is a ball bearing bushing, and the other is an indexing pin of a dimension to make a close sliding fit in the bushing.

The use of the pin ball bushing as indexing means permits close tolerances not heretofore practical. A carriage using such indexing means has been accurately positioned in the location with virtually zero tolerance (i.e., the tolerance has been so close that it measures zero when checked with conventional tolerance measuring instruments).

In the preferred form of the invention, the index pin and ball bearing bushing are reciprocated relative to each other so the pin moves in and out of the bushing. The end of the pin which enters the ball bushing first is tapered, preferably having a spherical surface. A tapered or conical guide is mounted in the entrance of the ball bushing so that if the carriage stops a slight distance from the exact location, the tapered pin and tapered entrance to the ball bushing cooperate to align the carriage automatically to the required position.

Preferably, at least two sets of indexing means are used, and they are mounted to move simultaneously and transversely with respect to each other so that the carriage is firmly locked against movement in any direction. Conveniently, all indexing means are operated simultaneously off of one cam which operates linkages that move the indexing means.

In the preferred form, the carriage is connected to a chain which is driven around a track by a sprocket which engages the chain. Rollers are mounted on the carriage to ride on the track. There is a slight amount of slack in the chain, and at least one of the rollers on the carriage is free to "float" relative to the carriage so that tolerance is provided for movement of the carriage relative to its carrying means to insure free movement of the carriage around the track.

In one form, the rollers which engage the track include a first set mounted on the carriage to rotate about a horizontal axis, and a second set mounted to rotate about a vertical axis to provide for lateral stability.

These and other aspects of the invention will be more fully understood from the following detailed description and in the accompanying drawings, in which:

FIG. 3 is an enlarged view, partly broken away, taken in area 3—3 of FIG. 1.

Figure 1:
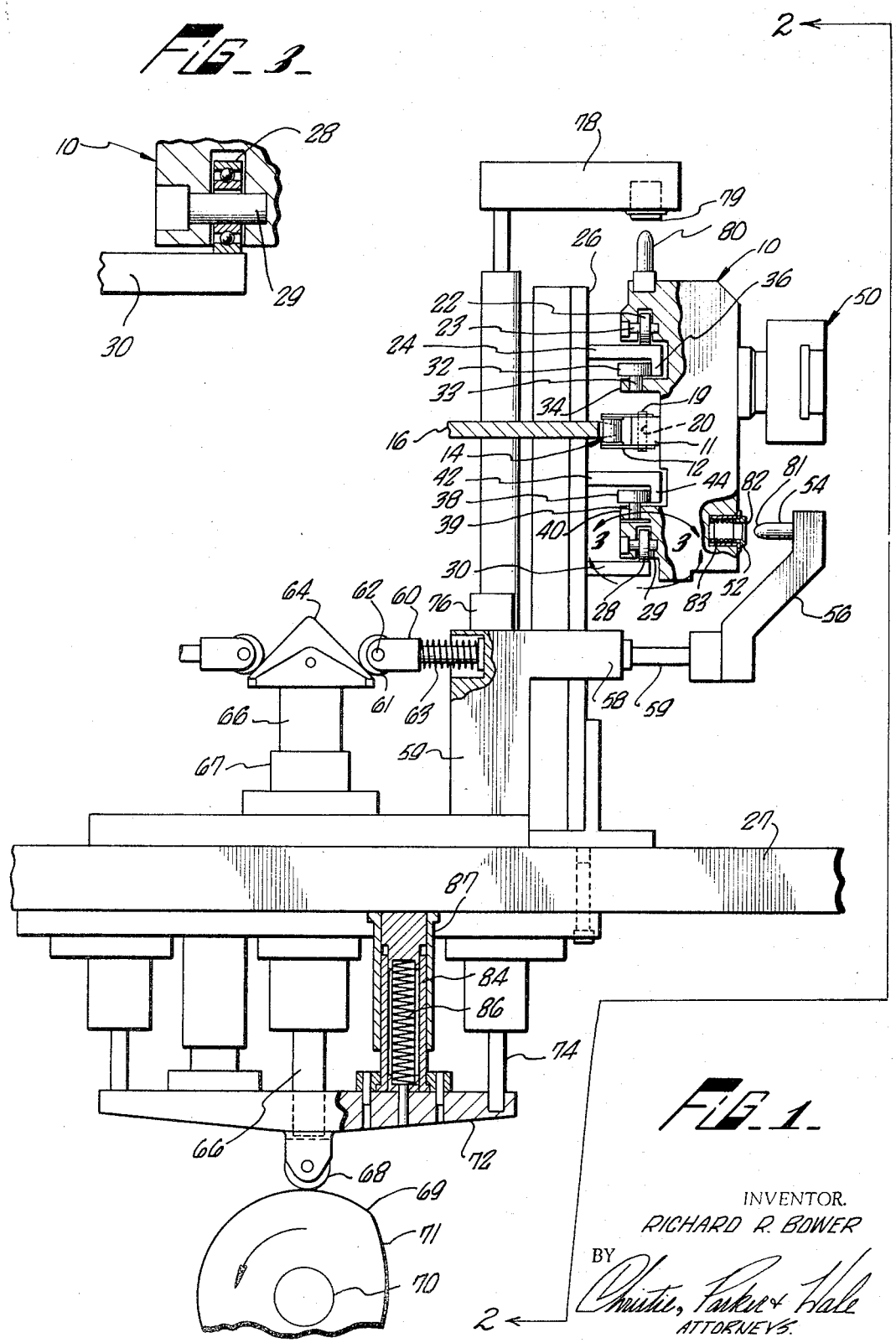
FIG. 1 is a fragmentary end elevation, partly broken away, of the presently preferred embodiment of the carriage and track assembly.

Referring to the drawing, an upright carriage 10 has a lug 11 which extends horizontally between a pair of links 12 secured to an endless chain 14 disposed around sprockets 16 mounted on vertical shafts 18 to rotate about upright axes. A vertical pin 19 extends down through bores (not shown) in the links 12 and a vertical bore 20 in the lug and collinear with the bores in the link to secure the carriage to the chain.

A pair of top rollers 22 are mounted on respective horizontal shafts 23 secured to the carriage so that the top rollers ride on a horizontal elongated endless top track 24 secured to a series of upright posts 26 attached at their bottom ends to a horizontal table 27.

A pair of bottom rollers 28 are journaled on respective horizontal transverse shafts 29 secured to the lower portion of the carriage so that the bottom roller rides on an elongated horizontal bottom track 30 secured to the upright posts below the top track.

A pair of upper stabilizing rollers 32 are journaled on respective vertical shafts 33 which extend upwardly from a shelf 34 formed integrally with the carriage to extend under the top track. The upper stabilizing roller rides against the inner face of a downwardly extending upper flange 36 secured to the outer edge of the top track.

A pair of lower stabilizing rollers 38 are journaled on respective vertical shafts 39 which extend upwardly from a lower shelf 40 formed integrally with the carriage to extend horizontally under horizontal plate 42 secured to the upright posts. The lower stabilizing rollers bear against the inner face of a downwardly extending lower flange 44 secured to the outer edge of the horizontal plate 42.

Preferably, all of the carriage rollers are of the ball bearing type in which the inner race makes a tight fit on the supporting shaft. However, the bottom rollers are an exception because their inner races are about .010 inch larger in diameter than their shafts so the bottom rollers "float," i.e., have a definite amount of play so that the carriage is free to move slightly with respect to the track and chain (see FIG. 3). This facilitates free movement of the carriage around the entire length of the track without binding, and without having to build the entire track and chain assembly with close tolerances.

The chain is moved intermittently by conventional drive means (not shown) to step the carriage around the track into different locations. A suitable jig fixture 50, or the like, is mounted on the carriage to hold parts (not shown) which are to be operated on at a desired location adjacent the track.

Figure 2:
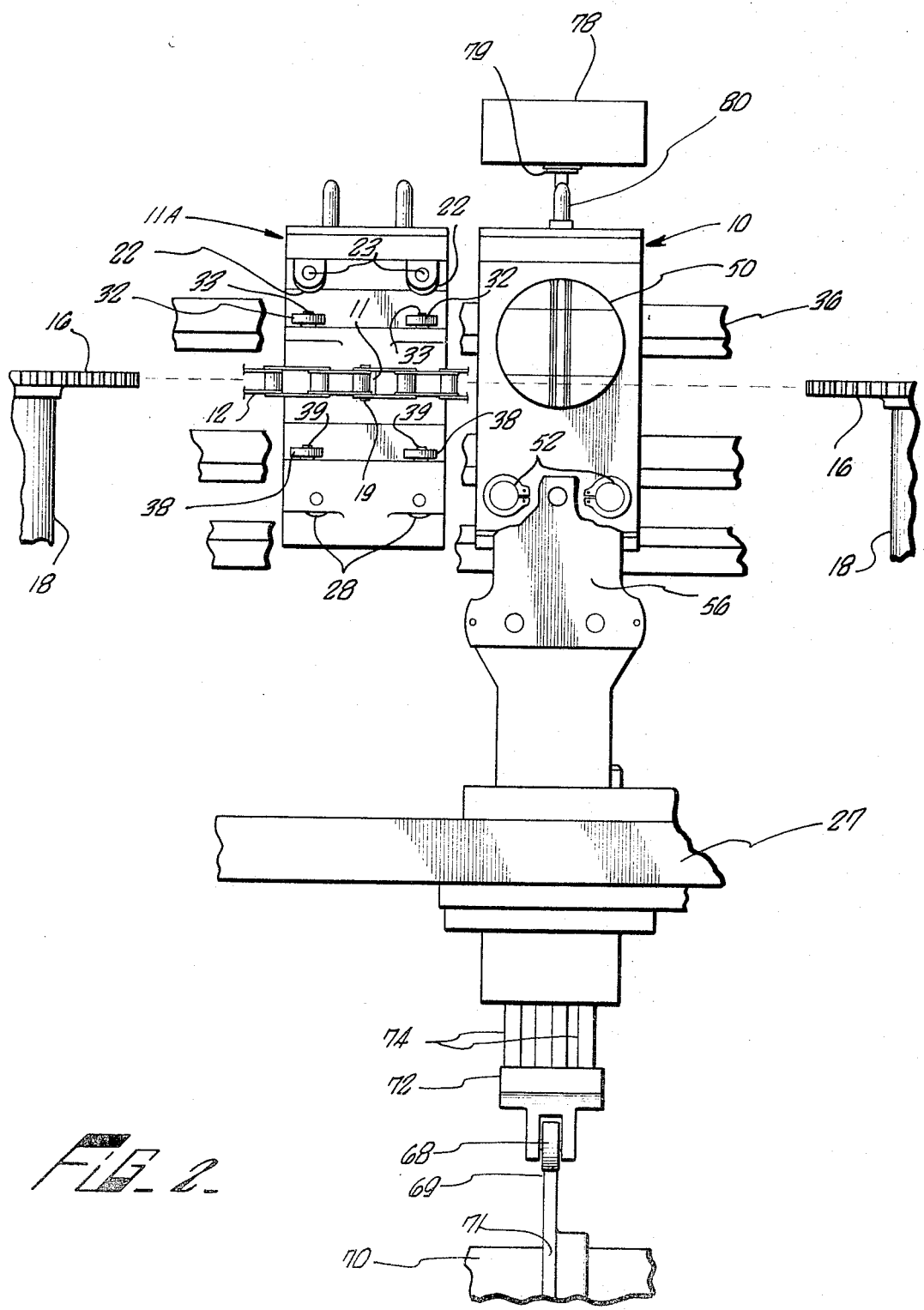
FIG. 2 is a view taken on line 2—2 of FIG. 1.

Although only one carriage is described in detail, a number of them are mounted on the chain and track, the inner face of a second carriage 11A being shown to the left (as viewed in FIG. 2) of the carriage 11 on the back stretch of track.

A pair of horizontally spaced ball bushings 52 are mounted on the outer face of the carriage, and open outwardly to receive respective horizontal index pins 54 mounted on an upwardly and outwardly extending bottom index arm 56 secured at its lower end to adjacent ends of laterally spaced horizontal push rods 57 which are mounted to slide in a respective horizontal guide sleeve 58 in a rod block 59 mounted on the table 27. The other ends of the push rods are secured to a horizontal push rod bar 60 which carries a cam or follower roller 61 mounted on a horizontal shaft 62 secured to the bar 60. A separate compression spring 63 around each push rod urges the push rods to the left (as view in FIG. 1.) Cam roller 61 rides up and down a downwardly and outwardly extending pushing cam 64 which is secured to the upper end of a vertical cam rod 66 disposed through a cam rod sleeve 67 mounted in the table 27. The lower end of the vertical cam rod 66 carries a cam following roller 68 which rides on a lifting cam 69 mounted on a horizontal cam shaft 70 and rotated by conventional drive means synchronized with the driving means for the sprockets. Lifting cam 69 includes a low portion 71 which functions as described in detail below.

The apparatus is symmetrical about a plane passing through the longitudinal axis of vertical cam rod 66 and normal to the plane of FIG. 1. However, the complete machine is not described for brevity.

An outwardly extending bridge 72 is secured to the lower end of the vertical cam rod 66, and is attached at its outer end to the lower ends of a pair of laterally spaced vertical lift rods 74 which each extend up through a respective vertical guide sleeve 76 in the rod block 59 mounted on the table 27. A horizontal upper index arm 78 is secured at one end to the upper ends of the vertical lift rods, and extends out over the track and carriage when the carriage is in the desired location.

A pair of downwardly opening ball bushings 79 are mounted in the lower face of the outer end of the upper index arm over a pair of laterally spaced vertical index pins 80 mounted on the top of the carriage.

Each of the horizontal and vertical index pins has a spherical point 81 to facilitate easy entry into each respective ball bushing, which has an outwardly flaring tapered entry 82 to guide each index pin to fit exactly within a series of ball bearings 83 mounted within each ball when the index arms are moved through the action of the appropriate cams as described in detail below.

The vertical cam rod 66 is urged downwardly by a compression spring 84 mounted in an upwardly opening inner spring sleeve 86 secured at its lower end to the top of the bridge 72. The upper end of the compression spring bears against the bottom of the table which carries an outer spring sleeve 87 that makes a close sliding fit around the inner sleeve 86.

In the operation of the apparatus, the carriage is moved into the general vicinity of the desired location so that the ball bushings are approximately aligned with their respective index pins, and the carriage is stopped in this position by suitable conventional control means on the drive shaft for the chain sprockets. The lifting cam 70 is then rotated so that its low portion 71 moves under the cam following roller 68, allowing the vertical cam rod 66 to move down and carry the bridge 72 down with it.

As the bridge moves down, vertical lift rods 74 move down so the ball bushings 79 in the upper index arm slide down over respective vertical index pins. This locks the carriage firmly and accurately against movement in a horizontal plane.

The lowering of the vertical cam rod slides the pushing cam 64 down so that the push rods are forced to the left (as viewed in FIG. 1) by the compression springs 63.

The horizontal index pins on the bottom index arm each enter a respective ball bushing to lock the carriage firmly against movement in a vertical plane. The carriage is now rigidly locked against any movement with respect to the table so that a part or parts carried by the fixture 50 on the carriage are accurately positioned for automatic manipulation.

The vertical lift rods and horizontal push rods are each mounted through ball bushings so that there is not a measurable amount of tolerance or relative movement between the rods and the rod block, which is in turn rigidly secured to the table. This insures an exact location of the carriage when the vertical index pins engage their respective ball bushings.

The carriage mounted as just described was checked with conventional tolerance measuring instruments and found to be secured to zero tolerance, i.e., no movement could be detected by the instrument. This high degree of intermittent rigid mounting of the movable carriage is made possible by the index pins fitting into ball bushings. The combination of the pins and ball bushings permit closer tolerances that would otherwise be possible because the balls are self-cleaning and minute particles of dust do not interfere with proper mating of the pins, as would occur otherwise if ball bearing bushings were not used.

I claim:

1. Apparatus for carrying an article to and fixing it exactly at a location, the apparatus comprising a carriage adapted to carry the article, means for moving the carriage to and stopping it in the general vicinity of the location, the carriage having some freedom of movement with respect to its moving means when stopped in the general vicinity of the location, first indexing means on the carriage, second indexing means mounted adjacent the location, third indexing means on the carriage and extending transversely to the first indexing means on the carriage, fourth indexing means mounted adjacent the location and extending transversely to the second indexing means, the first and second indexing means being matable with each other, the third and fourth indexing means being matable with each other, and means for moving the indexing means relative to each other to engage and position the carriage exactly at the location.

2. Apparatus for carrying an article to and fixing it exactly at a location, the apparatus comprising a carriage adapted to carry the article, means for moving the carriage to and stopping it in the general vicinity of the location, the carriage having some freedom of movement with respect to its moving means when stopped in the general vicinity of the location, first indexing means on the carriage, second indexing means mounted adjacent the location, third indexing means on the carriage and extending transversely to the first indexing means on the carriage, fourth indexing means mounted adjacent the location and extending transversely to the second indexing means, the first and second indexing means being matable with each other, the third and fourth indexing means being matable with each other, and means for moving the indexing means relative to each other to engage and position the carriage exactly at the location, one of the first and second indexing means and one of a third and fourth indexing means each being a ball bearing bushing, and each of the other indexing means being a pin of a dimension to make a close sliding fit in a respective bushing.

3. Apparatus for carrying an article to and fixing it exactly at a location, the apparatus comprising a carriage adapted to carry the article, means for moving the carriage to and stopping it in the general vicinity of the location, the carriage having some freedom of movement with respect to its moving means when stopped in the general vicinity of the location, first indexing means on the carriage, second indexing means mounted adjacent the location, third indexing means on the carriage and extending transversely to the first indexing means on the carriage, fourth indexing means mounted adjacent the location and extending transversely to the second indexing means, the first and second indexing means being matable with each other, the third and fourth indexing means being matable with each other, a rotatable cam, and linkage means responsive to the movement of the cam for moving the indexing means relative to each other to engage and position the carriage exactly at the location, one of the indexing means being a ball bearing bushing, and the other being a pin of a dimension to make a close sliding fit in the bushing.

4. Apparatus for carrying an article to and fixing it exactly at a location, the apparatus comprising a carriage adapted to carry the article, upper and lower elongated and substantially horizontal tracks mounted adjacent the location, a first roller mounted on the carriage to ride on the upper track, a second roller mounted on the carriage to ride on the lower track, one of the rollers being free to shift laterally with respect to its axis of rotation and relative to the carriage, means for moving the carriage on the track to and stopping it in the general vicinity of the location, the carriage having some freedom of movement with respect to its moving means when stopped in the general vicinity of the location, indexing means on the carriage, indexing means mounted adjacent the location, the two indexing means being matable with each other, and means for moving the two indexing means relative to each other to engage and position the carriage exactly at the location, one of the indexing means being a ball bearing bushing, and the other being a pin of a dimension to make a close sliding fit in the bushing.

5. Apparatus for carrying an article to and fixing it exactly at a location, the apparatus comprising a carriage adapted to carry the article, an elongated track mounted adjacent the location, a first roller mounted on the carriage to ride on the track, a second roller mounted on the carriage to ride against the track and rotate about an axis transverse to that about which the first roller rotates, means for moving the carriage to and stopping it in the general vicinity of the location, the carriage having some freedom of movement with respect to its moving means when stopped in the general vicinity of the location, indexing means on the carriage, indexing means mounted adjacent the location, the two indexing means being matable with each other, and means for moving the two indexing means relative to each other to engage and position the carriage exactly at the location, one of the indexing means being a ball bearing bushing, and the other being a pin of a dimension to make a close sliding fit in the bushing.

6. Apparatus for carrying an article to and fixing it exactly at a location, the apparatus comprising a carriage adapted to carry the article, upper and lower elongated and substantially horizontal tracks mounted adjacent the location, a first roller mounted on the carriage to ride on the upper track, a second roller mounted on the carriage to ride against the upper track and rotate about an axis transverse to the axis about which the first roller rotates, a third roller mounted on the carriage to ride on the lower track, a fourth roller mounted on the carriage to ride against the lower track and rotate about an axis transverse to the axis about which the third roller rotates, one of the first and third rollers being free to shift laterally with a respect to its axis of rotation and relative to the carriage, means for moving the carriage to and stopping it in the general vicinity of the location, the carriage having some freedom of movement with respect to its moving means when stopped in the general vicinity of the location, indexing means on the carriage, indexing means mounted adjacent the location, the two indexing means being matable with each other, and means for moving the two indexing means relative to each other to engage and position the carriage exactly at the location, one of the indexing means being a ball bearing bushing, and the other being a pin of a dimension to make a close sliding fit in the bushing.

7. Apparatus for carrying an article to and fixing it exactly at a location, the apparatus comprising a carriage adapted to carry the article, means for moving the carriage to and stopping it in the general vicinity of the location, the carriage having some freedom of movement with respect to its moving means when stopped in the general vicinity of the location, first indexing means on the carriage, second indexing means mounted adjacent the location, third indexing means on the carriage and extending transversely to the first indexing means on the carriage, fourth indexing means mounted adjacent the location and extending transversely to the second indexing means, the first and second indexing means being matable with each other, the third and fourth indexing means being matable with each other, one of the indexing means being a ball bearing bushing, and the other being a pin of a dimension to make a close sliding fit in the bushing, a first guide sleeve mounted adjacent the location, a push rod connected to the second indexing means and mounted to make a close sliding fit in the first sleeve, a second guide sleeve mounted adjacent the location and extending transversely to the first guide sleeve, a lift rod connected to the fourth indexing means and mounted to make a close sliding fit in the second sleeve, a rotatable cam mounted adjacent the location, and means responsive to the rotation of the cam connected to the push and lift rods to move them simultaneously to engage the indexing means.

8. Apparatus for carrying an article to and fixing it exactly at a location, the apparatus comprising a carriage adapted to carry the article, means for moving the carriage to and stopping it in the general vicinity of the location, the carriage having some freedom of movement with respect to its moving means when stopped in the general vicinity of the location, first indexing means on the carriage, second indexing means mounted adjacent the location, third indexing means on the carriage and extending transversely to the first indexing means on the carriage, fourth indexing means mounted adjacent the location and extending transversely to the second indexing means, the first and second indexing means being matable with each other, the third and fourth indexing means being matable with each other, one of the indexing means being a ball bearing bushing, and the other being a pin of a dimension to make a close sliding fit in the bushing, a first ball bushing mounted adjacent the location, a push rod connected to the second indexing means and mounted to make a close sliding fit in the first ball bushing, a second ball bushing mounted adjacent the location and extending transversely to the first guide sleeve, a lift rod connected to the fourth indexing means and mounted to make a close sliding fit in the second ball bushing, a rotatable cam mounted adjacent the location, and means responsive to the rotation of the cam connected to the push and lift rods to move them simultaneously to engage the indexing means.

References Cited by the Examiner
UNITED STATES PATENTS

| 2,793,733 | 5/1957 | Karageorgieff | 198—19 |
| 3,088,197 | 5/1963 | Cargill | 198—191 |
| 3,179,236 | 4/1965 | Bower | 198—135 X |
| 3,213,996 | 10/1965 | Tech | 198—19 |

EVON C. BLUNK, *Primary Examiner.*
EDWARD A. SROKA, *Examiner.*